S. & M. PENNOCK.
Seed-Dropper.
No. 7,930. Patented Feb. 11, 1851.
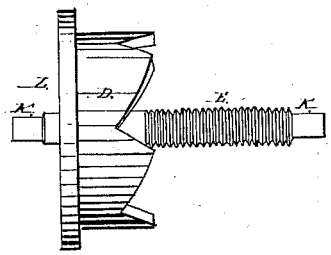
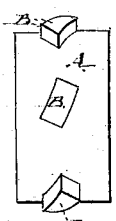
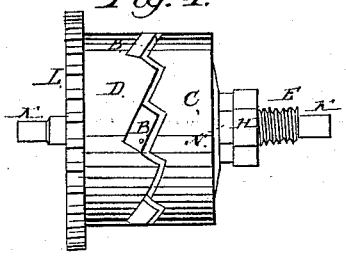
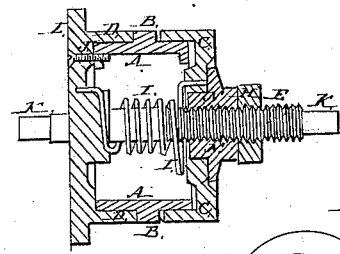
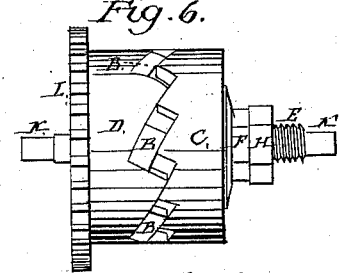
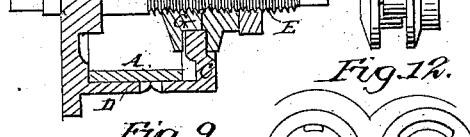
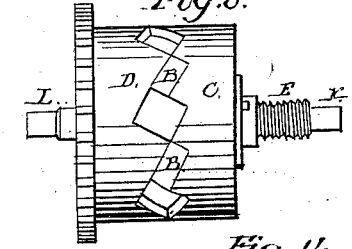
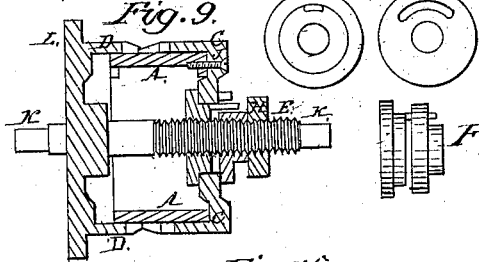
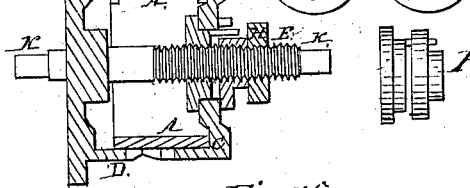
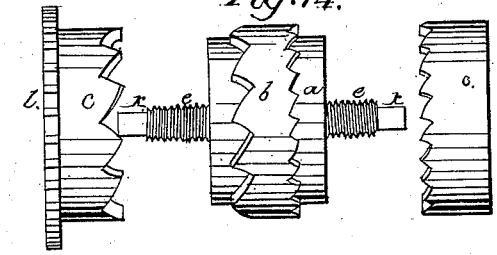
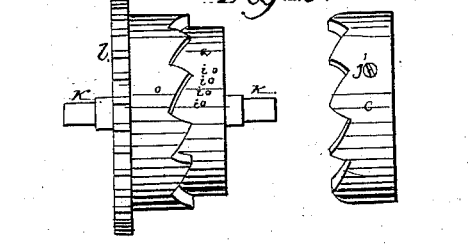

UNITED STATES PATENT OFFICE.

S. PENNOCK AND M. PENNOCK, OF KENNETT SQUARE, PENNSYLVANIA.

IMPROVEMENT IN SEEDING APPARATUS OF SEED-PLANTERS.

Specification forming part of Letters Patent No. 7,930, dated February 11, 1851.

*To all whom it may concern:*

Be it known that we, SAMUEL PENNOCK and MORTON PENNOCK, of Kennett Square, in the county of Chester and State of Pennsylvania, have invented certain new and useful improvements in revolving distributing-cylinders for planting seed and grain, distributing plaster-of-paris, ashes, bone-dust, and various pulverized manures, and for distributing grain in mills, and for other purposes, which is described as follows, reference being had to the annexed drawings of the same, making part of this specification.

The nature of our invention and improvement, and which distinguishes it from other inventions heretofore known and used, consists in making the distributing-cylinder (usually placed at the bottom of the hopper) in two or more parts, resembling cylinder-saws, placed on a plain cylinder with the teeth interlocking, one being fixed to the inner cylinder or cast with it, and the other made to turn upon it, so that in turning it—say to the right—the inclined sides of the teeth of the movable cylinder or cap will bear against the inclined sides of the teeth of the other cylinder and cause the movable cylinder or cap to move longitudinally simultaneously with its rotary movement on its axis, by which the spaces between the straight sides of the teeth are gradually enlarged to any degree required for distributing large or small seed or manures more or less pulverized, or for other purposes, the turning or gaging toothed cylinder or cap being turned by the action of a helical spring and nut and screw-shaft, or by a combination of screw-shaft, clutch-nut, clutch-washer, and clamp-nut, or simply by the thumbs and fore fingers of the operator, being held in any required position by a clamp-nut or by a small screw passed through the toothed cylinder or gage-cap into the inner or plain cylinder, or by any convenient means, the said spaces or receptacles for the seed or manure being diminished in size by simply reversing the movement of the gaging cylinder-cap or turning it to the left, the helical spring or screw-shaft and nut or the pressure of the hand serving to draw the movable cylinder toward the fixed cylinder, and consequently to cause the teeth to interlock more closely and to diminish the spaces between them; or the cylindrical toothed gage-cap may be moved by a clutch-nut on the screw-shaft without the angular projection being in contact, by which the distributing-receptacle may be made endless; also, in making the teeth near both ends of the ring on the cylinder of different numbers and sizes and applying a corresponding toothed gage cylinder or cap to each end, by which one cylinder is made capable of producing a greater number of changes in the form and sizes of the cells or distributing-receptacles; likewise, in making the cylinder upon which the two toothed gage cylinders or caps are arranged with a circle of oblong projections around the middle of the same, the longest sides standing at the same angle as the hypoteneuse of the triangle that subtends the projections of the gage or turning cylinder-caps, and designed to fit the angular recesses between said projections for the purpose of increasing the number of recesses in one of the cylinder-caps (made with large projections) and for decreasing the number of receptacles in the other cylinder-cap (made with small projections) by closing every alternate small space between the small projections by fitting into the same, said middle piece of the cylinder, with its oblong projections, being fastened to either gage cylinder-cap by a screw or otherwise, according to the kind and number of distributing-receptacles that may be required, the opposite cylinder-cap being made to turn and serve as the gage for altering the size and shape of the distributing-receptacles, as in the first-described modification of the cylinder; also, in so combining a screw-shaft, clutch-nut, clutch-washer, and clamp-nut with the stationary and gage cylinder-caps as to move the latter with a positive, gradual, and exact movement, by which the projections of the gage cylinder-cap may be changed in position in relation to the projections on the stationary cylinder-cap with the greatest ease and utmost nicety for increasing or diminishing the size and form of the distributing-receptacles.

In the drawings, Figures 1, 2, and 3 represent the several parts composing one of the modifications of the distributing-cylinder separated from each other in order to show their several forms more distinctly, Fig. 1 being the part to which the ordinary cog-wheel for turning the cylinder is affixed, Fig. 2 the middle part, containing the oblong projections for changing the size and number of the distributing-receptacles, and Fig. 3 the part that is made to turn on the middle part when the part shown in Fig. 1 is fastened to said middle part for altering the size and shape of the receptacles, and which is fixed to the middle portion when the portion shown in Fig. 1 is made to turn thereon. Fig. 4 represents Figs. 1, 2, and 3 put together, producing a cylinder containing a continuous or endless zigzag receptacle for distributing small seed—such as clover and timothy—and finely-pulverized manures, plaster-of-paris, ashes, bone-dust, &c. Fig. 5 is a longitudinal section of Fig. 4, showing the arrangement of the screw-shaft, flanged nut, clamp-nut, and helical spring attached to the heads of the two parts of the cylinder containing the triangular projections. Fig. 6 is an external view of the same cylinder, the several parts being so arranged as to produce twelve small square receptacles for distributing wheat, rye, and such medium-sized grain or seed. It may of course be made to produce a greater or lesser number of cells, as desired. Fig. 7 is a longitudinal section of Fig. 6, showing the clutch-nut, clutch-washer, and clamp-nut in connection with the screw-shaft, which may be used with or without the helical spring for turning the gage-cylinder. Fig. 8 is an external view of the same cylinder having the several parts so changed in position as to increase the size of the distributing-receptacle to four times the size of those represented in Fig. 6, for planting Indian corn, oats, beans, peas, and other large-sized seeds, (being reduced in number one-half,) which is effected by detaching the middle section from the section containing the large triangular projections and attaching it to the section containing the small projections, thus making the projections on the two sections of the cylinder of the same size, shape, and number, so that when they are brought together and made to interlock as many large oblong receptacles may be formed as there are projections on each section. Fig. 9 is a longitudinal section of same, showing another form of clutch-nut, which may be used instead of the one represented in Fig. 7. Fig. 10 is a plan view of the clutch-nut and clutch-washer shown in Fig. 7. Fig. 11 is a view of same connected together. Fig. 12 is a plan of the nut shown in Fig. 9, the parts being separated. Fig. 13 is a view of same connected together. Fig. 14 is modification of the seed and manure distributer, showing a plain cylinder surrounded by a cylindrical ring containing small triangular projections or teeth on one end and large ones on the opposite end, having a toothed cylindrical cap adapted to each set of projections turning on the ends of the plain cylinder, so that many small cells or half the number of large cells may be formed at pleasure by turning the cylindrical caps, as before stated. The cylindrical ring may be cast with the plain cylinder in one piece, as it is not necessary to move it; or it may be made in the form of a coarse and fine cylinder-saw and fastened to the plain cylinder by screws or otherwise. In this case the cog-wheel should be fastened to the outer end of one of the gage-caps; or the cogs may be formed on the periphery of the same. Fig. 15 is the simplest form in which we construct this description of distributer, and is made like that represented in Fig. 14, except that only one cylindrical cap, with angular projections or teeth on its inner end, is used to interlock with the projections on the largest diameter of the cylinder for increasing or diminishing the size and form of the circle of distributing-receptacles by simply turning the cylindrical gage-cap by hand or otherwise on the reduced part of the cylinder, the projections of the cap being in contact with those of the cylinder when the receptacles are required to be separated and not in contact when the receptacle is required to be endless, the gage-cap being secured in any required position by a screw passing through the periphery of the cap into the periphery of the cylinder, or by any suitable means. In this modification the screw-shaft, nuts, and helical spring may be dispensed with, the cylinder being solid and the cog-wheel affixed to the larger end, or the cogs cast thereon, or the cylinder may be hollow and the screw-shaft, spring, and clutch-nuts used, as preferred. In either case the cylinder will have a gudgeon at each end to turn in the spring-bearings of the hopper, to which it is to be attached in the usual way, as described in our patent of July 9, 1850. This form of distributing-cylinder we have found in practice to answer well but it is not so convenient as the first-described modification, as we cannot make as many changes with it as we are often required to accomplish in our seeding-machines.

Where the same letters occur on the several figures they indicate the same parts.

A is the cylinder, made hollow, of cast iron, wood, or any suitable material, and of any required size.

B are the projections on the periphery of the cylinder A for increasing the size and number of the projections on the ends of the cylindrical gage-caps by being connected to either cap at pleasure, according to the kind of distributing-receptacles that may be required to be formed, as illustrated in Figs. 6 and 8.

C is one of the cylindrical toothed gage-caps for making the various changes in the form, size, and number of the distributing-receptacles.

D is also one of the cylindrical gage toothed caps for the same purpose as cap C, and to which the propelling cog-wheel is affixed.

E is the screw-shaft upon which the clutch-nut, clutch-washer, and clamp-nut are placed for turning the gage-cap C on its axis and longitudinally to the right or left, said screw-shaft passing through the center of the head of the cylindrical cap D, and being affixed thereto, projecting a greater length on the inner side of the head than on the outer.

F is the clutch-washer, and G the clutch-nut, embracing the head of the cylindrical gage-cap C, turned simultaneously to the right or to the left on the screw-shaft E by a wrench or other means for turning the cap when the clamp-nut is loosened.

H is the clamp-nut. By the use of these nuts and washer the cap may be turned and adjusted without the spring.

I is a helical spring placed around the screw-shaft, without touching it, and between the heads of the toothed caps, to which its ends are connected for moving the gage-cap longitudinally simultaneously with its rotary movement on its axis as the clamp-nut is turned to the left or loosened for altering the size and shape of the distributing-receptacles. By turning the nut to the right the cap C is caused to approach the cap D and contract the spring, and as the inclined sides of the projections on the caps crowd against each other the gage-cap C will be caused to turn on its axis to the right, and thus enlarge the receptacles.

J is the screw for connecting the cylinder to either cap at pleasure. When one cap is connected to the cylinder the other is detached. The screw passes through the head of the cap into the end of the cylinder. When the cap D is connected to the cylinder A the projections on the cylinder A will be in the notches between the teeth of the said cap D, causing the number of the receptacles to be reduced in size and increased in number, as seen in Fig. 6, and when the said cap D and cylinder A are detached and the cap C is screwed to the opposite end of the cylinder A, as seen in Fig. 9, the oblong projections on its periphery will be in every alternate notch, which will cause said projections and the teeth between which it is placed to form one triangular tooth of the same size as the teeth on the opposite cylindrical cap D, with which they are to interlock to form the large distributing-receptacles, as represented in Fig. 8.

K are the gudgeons of the distributing-cylinder, which turn in the spring-bearings fastened to the hopper or hopper-frame, or otherwise. These gudgeons are formed on the ends of the screw-shaft when one is used; but when the screw-shaft is not used they are cast in the ends of the cylinder, as seen in Fig. 15.

L are the cogs on the distributing-cylinder, which engage with the cog-wheels on the main axle of our patented seed-planting machines, which, being so well known, need not be here described.

*a*, Figs. 14 and 15, represents the cylinders of the modified forms of our revolving distributers.

*b* is a double-toothed ring attached to or cast on the cylinder.

*c* are the cylindrical toothed gage-caps, made and operated in the manner and for the same purpose as the caps in the before-described modifications of the distributer.

*e* is the screw-shaft, to be used when one is required to be used.

*j* is a screw for securing the toothed cap to the cylinder.

*i* are the female screws in the cylinder, into which the screw *j* is screwed, of which there may be any required number, arranged to suit the position of the gage-cap.

*k* are the gudgeons of the shaft, which turn in the spring-bearings of the hopper.

*l* are the cogs, which are brought into gear with the cog-wheels on the main axle when the machine is in operation, and which are disengaged when the hoppers are raised to stop the distributing operation, as practiced in the use of our seeding-machines.

The operation of the improved distributer having been explained in giving a description of the construction and arrangement of its several parts, it will be unnecessary to say more on that head. We will, however, add that the projections and depressions on the open ends of the cylindrical caps for making the endless variety of seed and grain distributing cells may be made curved or otherwise instead of straight and angular, as represented in the annexed drawings, and be adapted for feeding grain from hoppers into grinding-mills, and for a variety of purposes, and be constructed in other ways for producing the same result, substantially on the principle herein set forth.

Having thus fully described the manner of constructing and operating our revolving multiplied distributer and several of the modified forms of the same for distributing seed and grain and manures and other substances for various purposes, what we claim as our invention, and desire to secure by Letters Patent, is—

1. The employment of the ring or cylinder A, having projections on its periphery, in combination with the notched and toothed cylindrical gage-caps C D, constructed, arranged, and operated substantially in the manner herein set forth, for increasing and diminishing the size and number of the distributing-receptacles, as represented in Figs. 1, 2, 3, 4, 5, and 6.

2. The combination of the helical spring I, screw-shaft E, flanged nut N, and clamp-nut H with the notched and toothed cylindrical gage-caps, to which the ends of the spring are attached for turning the gage-cap in order to change the relationship of the teeth or projections of one of the caps with the teeth or projections on the adjacent cap for enlarging the distributing-receptacle, as described in the foregoing specification and represented at Fig. 5 in the annexed drawings.

3. The combination of the screw-shaft E, clutch-nut G, clutch-washer F, and clamp-nut H with the toothed cylinder-caps C D, for enlarging or diminishing the distributing-receptacles, as described, and represented in Fig. 7.

4. The modifications of the distributing apparatus in their simplified forms, as represented in Figs. 14 and 15, the several parts being operated in the manner herein set forth.

In testimony whereof we have hereunto signed our names before two subscribing witnesses.

SAMUEL PENNOCK.
    MORTON PENNOCK.

Witnesses:
 HENRY FLEMING,
 JOSHUA CLENDENON.